(12) United States Patent
Sun et al.

(10) Patent No.: US 10,757,728 B2
(45) Date of Patent: Aug. 25, 2020

(54) MULTIPLE TRANSMISSION TIME INTERVAL COEXISTENCE

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Shimman Arvind Patel, San Diego, CA (US); Aleksandar Damnjanovic, Del Mar, CA (US); Hao Xu, Beijing (CN); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/355,105

(22) Filed: Mar. 15, 2019

(65) Prior Publication Data

US 2019/0215859 A1 Jul. 11, 2019

Related U.S. Application Data

(63) Continuation of application No. 15/592,855, filed on May 11, 2017, now abandoned.
(Continued)

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0087* (2013.01); *H04L 27/2602* (2013.01);
(Continued)

(58) Field of Classification Search
CPC ................................................ H04W 72/1289
See application file for complete search history.

(56) References Cited

U.S. PATENT DOCUMENTS

| 2003/0153276 A1 | 8/2003 | Terry et al. |
| 2015/0188650 A1 | 7/2015 | Au et al. |

(Continued)

FOREIGN PATENT DOCUMENTS

| WO | WO-2009104922 A2 | 8/2009 |
| WO | WO-2016064544 A1 | 4/2016 |

OTHER PUBLICATIONS

International Search Report and Written Opinion—PCT/US2017/032326—ISA/EPO—dated Aug. 16, 2017.

*Primary Examiner* — Jason E Mattis
(74) *Attorney, Agent, or Firm* — Holland & Hart LLP/Qualcomm

(57) ABSTRACT

Methods, systems, and devices for wireless communication are described. Different transmission time interval (TTI) durations may be supported and configured to coexist with one another. A set of TTIs with a relatively short duration may overlap in time with longer duration TTIs. Boundaries of TTIs with a relatively short duration may be configured to align with boundaries of relatively longer duration TTIs. For example, TTIs that are a Long Term Evolution (LTE) subframe, an LTE slot, and a duration of two LTE symbol periods may be supported. Two-symbol period TTIs may align with or be embedded within slot-duration TTIs, which, in turn, may align with or be embedded within a subframe. In some examples, one or more symbol periods of a subframe may be designated as a gap between two-symbol TTIs within the subframe, or such symbols may be merged with a two-symbol TTI within the subframe.

30 Claims, 13 Drawing Sheets

Related U.S. Application Data

(60) Provisional application No. 62/336,436, filed on May 13, 2016.

(51) Int. Cl.
*H04L 27/26* (2006.01)
*H04W 72/04* (2009.01)

(52) U.S. Cl.
CPC ..... *H04L 27/2607* (2013.01); *H04W 72/0446* (2013.01); *H04L 5/001* (2013.01); *H04L 5/0023* (2013.01); *H04L 5/0044* (2013.01)

(56) References Cited

U.S. PATENT DOCUMENTS

| | | | |
|---|---|---|---|
| 2016/0128028 A1 | 5/2016 | Mallik et al. | |
| 2016/0128095 A1 | 5/2016 | Damnjanovic et al. | |
| 2017/0019886 A1* | 1/2017 | Patel | H04W 4/70 |
| 2017/0285130 A1 | 10/2017 | Kim et al. | |
| 2017/0290008 A1* | 10/2017 | Tooher | H04L 1/0007 |
| 2017/0332397 A1* | 11/2017 | Li | H04L 1/1887 |
| 2017/0332401 A1 | 11/2017 | Sun et al. | |
| 2019/0045394 A1* | 2/2019 | Takano | H04W 72/042 |
| 2019/0068423 A1* | 2/2019 | Hwang | H04L 5/0053 |

* cited by examiner

MULTIPLE TRANSMISSION TIME INTERVAL COEXISTENCE

CROSS REFERENCES

The present Application for Patent is a Continuation of U.S. patent application Ser. No. 15/592,855 entitled "Multiple Transmission Time Interval Coexistence," filed May 11, 2017, which claims priority to U.S. Provisional Patent Application No. 62/336,436 entitled "Multiple Transmission Time Interval Coexistence," filed May 13, 2016, each of which are assigned to the assignee hereof, and expressly incorporated by reference herein in their entirety.

BACKGROUND

The following relates generally to wireless communication and more specifically to multiple transmission time interval (TTI) coexistence within a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Wireless devices within an LTE or other multiple-access system may communicate with transmission time intervals (TTIs) of different durations. A TTI that is reduced relative to other TTIs may be employed to reduce the time between transmissions (e.g., between a transmission of data, a feedback response, and a retransmission). In some cases, different TTI durations may be appropriate for different UEs based on UE capabilities or channel conditions. Different UEs communicating with different TTI durations may, however, cause resource scheduling conflicts and increased system complexity.

SUMMARY

Different TTI durations may be supported and configured to coexist with one another within a wireless communications system. A set of TTIs with a relatively short duration may overlap in time with longer-duration TTIs. Boundaries of TTIs with a relatively short duration may be configured to align with boundaries of relatively longer duration TTIs, which may mitigate scheduling conflicts. For example, TTIs of a LTE subframe, an LTE slot, and a duration of two LTE symbol periods may be supported. The system may configure radio frames so that two-symbol TTIs may align with or may be embedded within slot-duration TTIs, which, in turn, may align with or be embedded within a subframe.

In some examples, one or more symbol periods of a subframe may be designated as a gap between two-symbol TTIs within the subframe, or such symbols may be merged with a two-symbol TTI within the subframe. Thus, a wireless system may utilize a TTI structure that includes gap symbols or irregular TTI durations to avoid timing or scheduling conflicts between UEs communicating using TTIs of different durations. For example, a TTI configuration including two-symbol TTIs and seven-symbol TTIs (e.g., 1-slot TTIs) may also include one or more gap symbols or merged, three-symbol TTIs among the two-symbol TTIs. In some cases, control signals may be transmitted within a low-latency or shorter-duration TTI; and in other cases, control signals may be transmitted using symbol periods that are not associated with one or more of the low latency TTIs. Both uplink and downlink communications may be configured to support coexistence between multiple TTIs of different durations.

A method of wireless communication is described. The method may include identifying a TTI of a first duration and identifying a set of TTIs of a second duration. The set may include each TTI of the second duration that is within the TTI of the first duration. The method may also include determining that one or more symbol periods of the TTI of the first duration are non-overlapping with any TTI of the set of TTIs of the second duration based at least in part on identifying the set of TTIs of the second duration, and communicating during the TTI of the first duration based at least in part on identifying the set of TTIs of the second duration and the one or more symbol periods.

An apparatus for wireless communication is also described. The apparatus may include means for identifying a TTI of a first duration and means for identifying a set of TTIs of a second duration. The set may include each TTI of the second duration that is within the TTI of the first duration. The apparatus may also include means for determining that one or more symbol periods of the TTI of the first duration are non-overlapping with any TTI of the set of TTIs of the second duration based at least in part on identifying the set of TTIs of the second duration and means for communicating during the TTI of the first duration based at least in part on identifying the set of TTIs of the second duration and the one or more symbol periods.

Another apparatus for wireless communication is described. The apparatus may include a processor, memory in electronic communication with the processor, and instructions stored in the memory. The instructions may be operable, when executed by the processor, to cause the apparatus to identify a TTI of a first duration and identify a set of TTIs of a second duration; the set may include each TTI of the second duration that is within the TTI of the first duration. The instructions may also be executable to cause the apparatus to determine that one or more symbol periods of the TTI of the first duration are non-overlapping with any TTI of the set of TTIs of the second duration based at least in part on identifying the set of TTIs of the second duration and communicate during the TTI of the first duration based at least in part on identifying the set of TTIs of the second duration and the one or more symbol periods.

A non-transitory computer-readable medium storing code for wireless communication is also described. The code may include instructions executable to identify a TTI of a first duration and identify a set of TTIs of a second duration. The set may include each TTI of the second duration that is within the TTI of the first duration. The code may also include instructions executable to determine that one or more symbol periods of the TTI of the first duration are non-overlapping with any TTI of the set of TTIs of the second duration based at least in part on identifying the set of TTIs of the second duration and communicate during the TTI of the first duration based at least in part on identifying the set of TTIs of the second duration and the one or more symbol periods.

DETAILED DESCRIPTION

Figure 1:
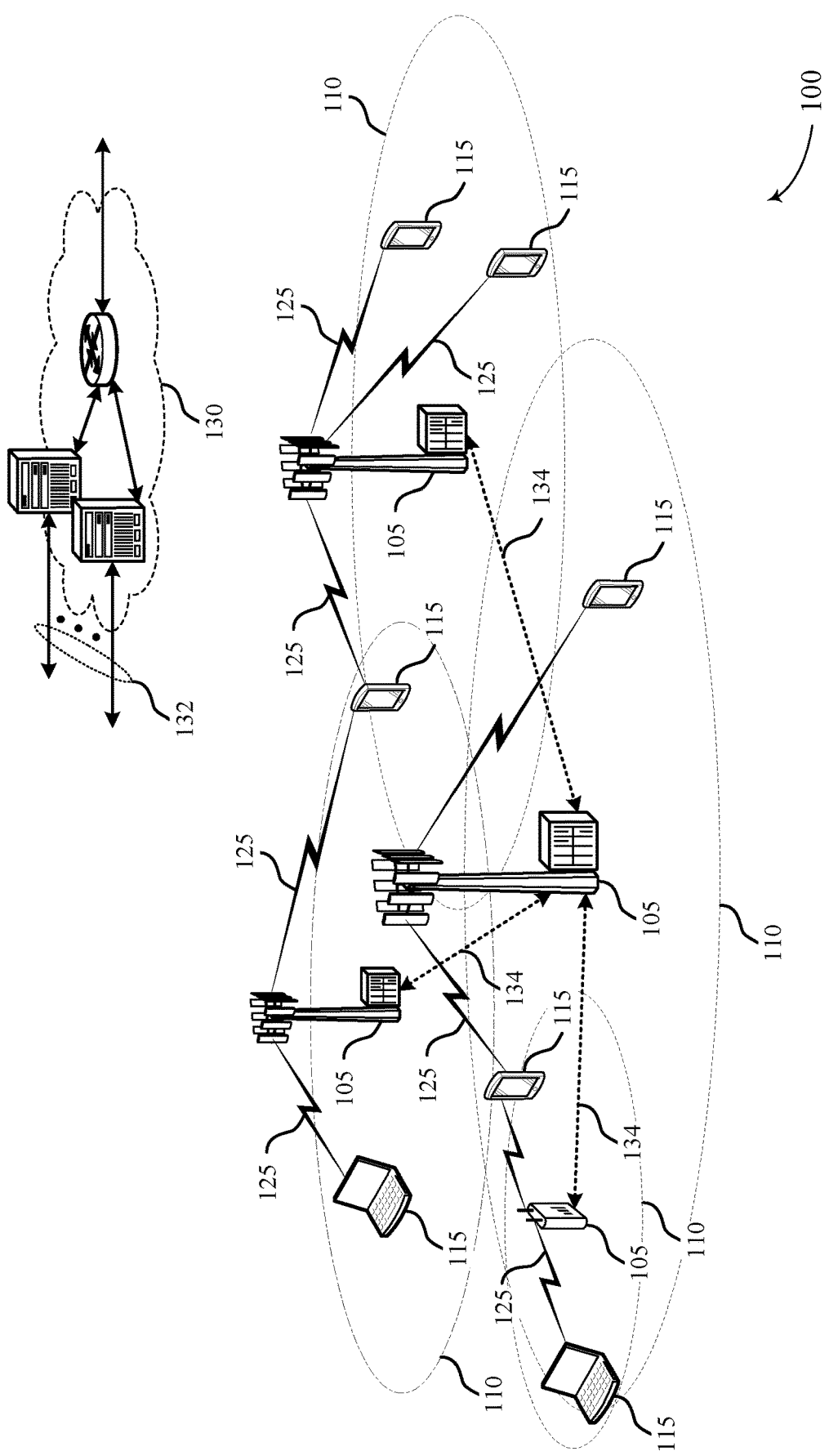
FIG. 1 illustrates an example of a wireless communication system that supports multiple transmission time interval (TTI) coexistence in accordance with aspects of the present disclosure.

Wireless communications systems may support low latency operations in which some transmission time intervals (TTIs) may have a reduced duration compared to other TTIs in the system or TTIs of other wireless systems. That is, downlink (DL) and uplink (UL) transmissions may be sent during TTIs with a shorter duration relative to other low-latency TTIs, or TTIs used in legacy (e.g., non-low latency) systems. In some cases, TTIs may span two symbol periods (e.g., orthogonal frequency division multiplexed (OFDM) symbols), one slot (e.g., seven symbols periods with a normal cyclic prefix (CP) or six symbol periods with an extended CP), or 1 ms (e.g., a Long Term Evolution (LTE) subframe). The reduced TTI durations may be scheduled to reduce latency between DL and UL transmissions.

By way of example, if the duration of one TTI length is not an integer multiple of a shorter TTI within the same system, a configuration based on regular sequences of the two different TTIs may result in TTIs of one length that fails to align with TTIs of another length. For example, there is no way to arrange two-symbol TTIs to fit evenly within a seven-symbol TTI (i.e., an LTE slot). Thus, according to the present disclosure, different durations of TTIs may be configured to align with one another by including occasional gap symbols or by utilizing a certain number of TTIs that include an additional symbol (e.g., a number of three-symbol TTIs may be included in a TTI configuration that is based on two-symbol TTIs in order to facilitate alignment with the seven-symbol TTIs).

A base station may use time division multiplexing (TDM) or frequency division multiplexing (FDM) to serve different user equipment (UEs) that are capable of using different TTI durations. UEs may simultaneously communicate with the base station using different TTI durations. Accordingly, various TTI durations may be scheduled to coexist with one another to enable efficient communication for different UEs. That is, a base station may schedule communications according to a UEs ability to communicate with different low latency TTIs such that one UE may be scheduled with one TTI duration (e.g., a two-symbol TTI) and another UE may be scheduled using a different TTI duration (e.g., a slot TTI).

As described herein, various low-latency TTI configurations may achieve efficient coexistence with different TTI durations by using one or more symbol periods that enable an alignment of a set of TTIs with other TTIs of longer durations. For example, a set of two-symbol TTIs that do not cross a slot TTI boundary may enable improved coexistence with slot TTIs. In some cases, the one or more symbol periods may include a one-symbol gap. The one-symbol gap may be left empty (e.g., the gap may not carry any data or control messages for UEs communicating with the two-symbol TTIs), and may be found in different locations among the set of TTIs. Additionally or alternatively, the one-symbol gap may be merged with one or more TTIs in a set to form a merged TTI (e.g., a three-symbol TTI may result from a merging of the one-symbol gap and a two-symbol TTI).

Aspects of the disclosure introduced above are described herein in the context of a wireless communication system. Further examples are then provided for TTI configurations that use a symbol gaps merged TTIs to enable efficient coexistence with multiple TTIs. Aspects of the disclosure are further illustrated by and described with reference to apparatus diagrams, system diagrams, and flowcharts that relate to title of the application.

FIG. 1 illustrates an example of a wireless communications system 100 that supports multiple transmission time interval (TTI) coexistence in accordance with aspects of the present disclosure. The wireless communications system 100 includes base stations 105, UEs 115, and a core network 130. In some examples, the wireless communications system 100 may be a LTE (or LTE-Advanced) network. Wireless communications system may support the use of sets of TTIs and one or more symbol periods to enable efficient low latency communications. The symbol periods may allow for the sets of TTIs to align with boundaries associated with different TTIs with longer durations.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

Time intervals in LTE may be expressed in multiples of a basic time unit (e.g., the sampling period, $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs). Wireless communications system 100 may utilize multiple TTI durations, such as TTI durations of 1 ms (a subframe), 0.5 ms (a slot), or two-symbol periods, which may be referred to as two-symbol TTIs.

A frame structure may be used to organize physical resources. A frame may be a 10 ms interval that may be further divided into 10 equally sized subframes. Each subframe may include two consecutive slots. Each slot may include six or seven orthogonal frequency division multiple access (OFDMA), symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be. Wireless communications system 100 may employ a frame structure—or subframe configuration—in which two-symbol TTIs are aligned with or embedded with slot-duration TTIs, which may be aligned with or embedded in subframes. So wireless communications system 100 may thus support coexistence among TTIs of different durations, which may allow for concurrent low-latency and legacy (e.g., LTE) communications.

Hybrid automatic repeat request (HARQ) may be a method of ensuring that data is received correctly over a wireless communication link 125. HARQ may include a combination of error detection (e.g., using a CRC), FEC, and retransmission (e.g., automatic repeat request (ARQ)). HARQ may improve throughput at the media access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. In some cases, HARQ may be transmitted according to a certain timeline established by a subframe or TTI configuration. In such cases, HARQ is transmitted after a certain duration that allows for the demodulation and processing of a received message.

Low latency operations may include communications in which TTIs have a reduced duration compared to other TTIs in the system or TTIs of other wireless systems. TTIs may span two symbol periods (e.g., OFDM symbols), one slot (e.g., seven symbols periods with a normal CP or six symbol periods with an extended CP), or one 1 ms (e.g., one LTE subframe). The reduced TTI durations may be scheduled to reduce latency between DL and UL transmissions. For example, in some wireless systems, a HARQ response time may take as long as 4 ms, whereas low latency systems may complete HARQ in hundreds of microseconds.

A set of reduced TTIs may include multiple two-symbol TTIs, where the duration associated with the set corresponds to a 1 ms TTI. A control region with a duration of two symbols may also be transmitted with the set of two-symbol TTIs. In TTI configurations, the multiple two-symbol TTIs may cross a boundary of other TTIs with different durations, such as a slot TTI (e.g., a seven symbol TTI). Accordingly, there may be seven (7) two-symbol TTIs within the duration of the 1 ms TTI. A demodulation reference signal (DMRS) design may also be altered with such a configuration.

As an example of a feedback processing timeline for such two-symbol TTI configurations, Table 1 below illustrates symbol gaps between TTIs used for transmission, feedback, and retransmission of a message. For instance, Table 1 illustrates a case where a DL transmission sent during a first TTI of a first subframe (e.g., TTI index 0). A feedback message (e.g., a HARQ transmission) for the received DL message may be sent during an UL TTI at the fifth TTI of the first subframe (e.g., UL TTI index 4). So the symbol gap between the DL TTI and the UL TTI may be six symbols. Similarly, a retransmission of DL data in response to the feedback message transmitted during the UL TTI may be sent in a second, subsequent, subframe. The retransmission may be sent during a second TTI of the second subframe (e.g., DL TTI index 1), where there is a six symbol gap between these TTIs, as illustrated in Table 1.

TABLE 1

| DL TTI index | Symbol Gap | UL TTI index | Symbol Gap | DL TTI index |
|---|---|---|---|---|
| 0 | 6 | 4 | 6 | 1 |
| 1 | 6 | 5 | 6 | 2 |
| 2 | 6 | 6 | 6 | 3 |
| 3 | 6 | 0 | 6 | 4 |
| 4 | 6 | 1 | 6 | 5 |
| 5 | 6 | 2 | 6 | 6 |
| 6 | 6 | 3 | 6 | 7 |

Thus, wireless communications system 100 may use a set of TTIs and one or more symbol periods to align the set of TTIs with a boundary of TTIs that have different durations. A wireless device may identify a number of different TTI durations, including a set of short TTIs and one or more symbol gaps. The one or more symbol periods may not overlap with the short TTIs, and the duration of the set of short TTIs and one or more symbol periods may correspond to a TTI having a longer duration. In some examples, the symbol period may include a symbol gap, or may alternately include a three-symbol TTI. The wireless device may communicate during the time period of the longer TTI based on the identification of the identified TTI durations and the symbol periods.

Figure 2:
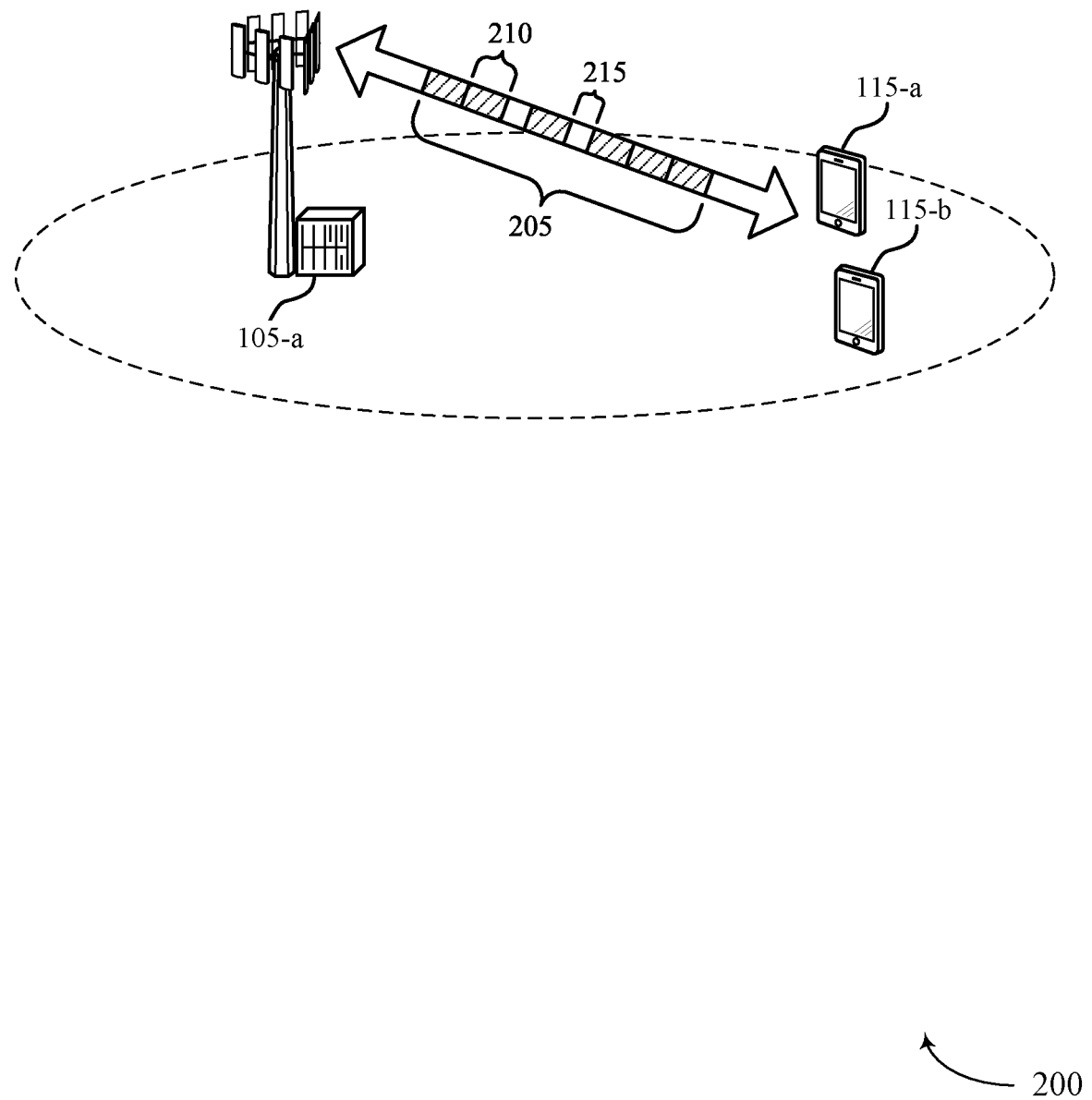
FIG. 2 illustrates an example of a wireless communications system that supports multiple TTI coexistence in accordance with aspects of the present disclosure.

FIG. 2 illustrates an example of a wireless communications system 200 that supports multiple TTI coexistence in accordance with aspects of the present disclosure. In some cases, wireless communications system 200 may represent aspects of techniques performed by a UE 115 or base station 105 as described with reference to FIG. 1. Wireless communications system 200 may support the coexistence of different TTIs that are aligned in time to enable efficient scheduling of low latency communications.

In wireless communications system 200, base station 105-a may serve different UEs 115 that are capable of using various TTI durations using TDM or FDM transmissions (such as UE 115-a and UE 115-b). In some examples, a UE 115 may communicate using a signal TTI durations (e.g., an operating mode of a UE 115 may govern a TTI duration used). Accordingly, various TTIs durations may be scheduled to coexist with one another to enable efficient communication for different UEs 115. Base station 105-a may schedule UEs 115 communication according to the UEs 115 ability to communicate with low latency TTIs, where UE 115-a may be scheduled with one TTI duration (e.g., a two-symbol TTI) and UE 115-b may be scheduled using a different TTI duration (e.g., a slot TTI), for example.

TTI configurations used in wireless communications system 200 may enable improved coexistence with multiple TTI durations. For example, wireless communications system 200 may use a set of short-duration TTIs (or "short TTIs") during a same time period corresponding to a longer TTI. For example, a first TTI duration 205 may correspond to a set of short TTIs 210 of a second duration, where the first TTI duration 205 may correspond to a 1 ms TTI and the second duration may correspond to a two-symbol TTI. One or more symbol periods 215 may not overlap with the short TTIs 210 in the set of short TTIs, and in some cases the one or more symbol periods may include a one-symbol gap or an merged TTI, such as a three-symbol TTI.

As an example, a two-symbol TTI configuration where the two-symbol TTIs do not cross a slot boundary may provide improved coexistence with slot TTIs. In such cases, a slot may contain seven symbols and a symbol period 215 of a 1-symbol gap may be created when a set of two-symbol TTIs is scheduled to correspond to the duration of a slot TTI. This may also be the case when the duration of a slot corresponds to a two-symbol control region and two two-symbol TTIs. In some cases, the 1-symbol gap may be left empty, and may be found in different locations of the set of short TTIs 210. Additionally or alternatively, the 1-symbol gap may be merged with a two-symbol TTI to form a symbol period including a merged TTI (e.g., a 3-symbol TTI may result from a merging of the symbol gap and a two-symbol TTI). In some cases, a size limitation for the merged TTI may be applied to ensure the processing delay associated with the merged TTI does not become too great. For example, a transport block size (TBS) limitation may be applied such that a maximum TBS size will match the TBS in a two-symbol TTI. Base station 105-a may control the application of a size limitation to merged TTIs.

DL transmissions using sets of short TTIs 210 may account for control regions of different durations when configuring a set of short TTIs 210. In such cases, the short TTIs 210 may not cross symbol boundaries of data or control regions. As an example, control symbols with a duration of two or three symbols may be associated with corresponding TTIs during which a control channel element (CCE) is transmitted. That is, a 3-symbol control region may be treated as a 3-symbol TTI. In such cases, the available number of resource elements (RE) may be relatively small and an associated processing time may be close to the processing time for two-symbol TTIs.

UL transmissions may also account for the coexistence of different TTI durations. For example, during an UL transmission a two-symbol TTI may not cross a slot boundary. In some cases, UL transmissions may include the same number of short TTIs 210 as a corresponding DL transmission, such as when a DL transmission includes six two-symbol TTIs the UL may also include six two-symbol short TTI. That is, there may be a one-to-one mapping of UL TTIs and DL TTIs if the number of TTIs is the same.

In some cases, it may be determined that a feedback processing timeline may be relaxed, where a processing timeline of N+4 (e.g., feedback may be transmitted four TTIs following receipt of a signal) may be extended to allow for a greater number of TTIs or symbols for processing feedback or retransmission. For example, a decoding time may scale with TTI length, but a time for a wireless device's software or other componentry to process feedback may not scale. Thus, a longer symbol gap may be used for feedback processing. To achieve this, DL and UL transmission may have the same TTI structure, where a DL TTI maps to an UL TTI. For example, a DL TTI located first in a subframe may map to a UL TTI in a subsequent subframe, where the UL provides feedback for data in the DL TTI. In such cases, a symbol gap for the processing delay may be 11 or 12 symbols.

Figure 3:
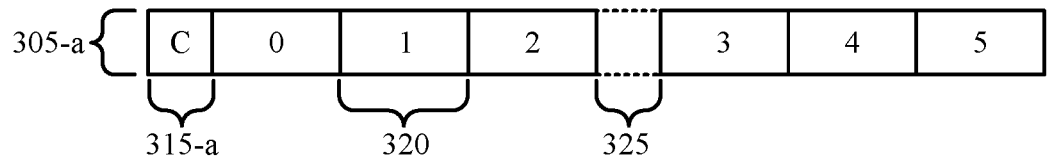
FIGS. 3 and 4 illustrate examples of TTI schemes in a system that supports multiple TTI coexistence in accordance with aspects of the present disclosure.
Figure 3:
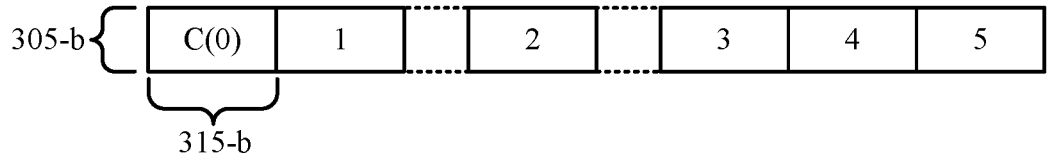
Figure 3:
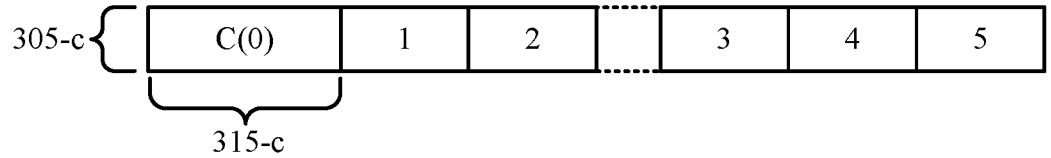
Figure 3:
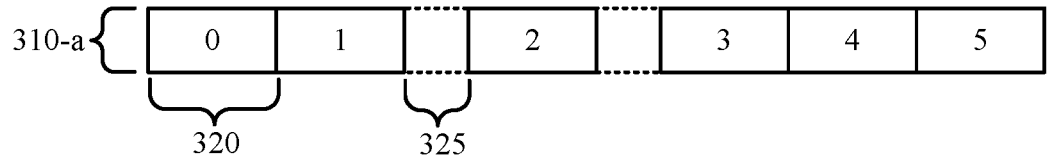
Figure 3:
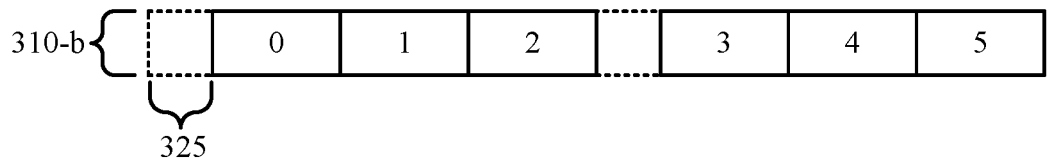
Figure 3:
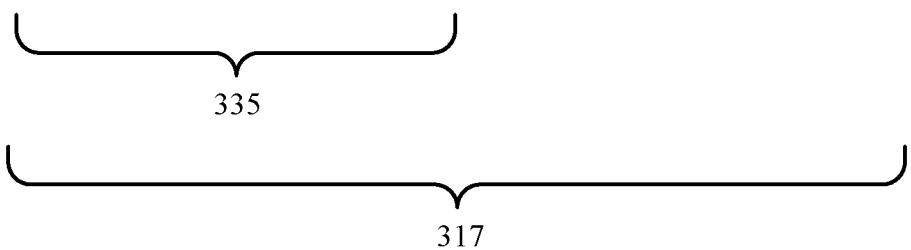

FIG. 3 illustrates an example of TTI schemes 300 in a system that supports multiple TTI coexistence in accordance with aspects of the present disclosure. In some cases, TTI schemes 300 may represent aspects of techniques performed by a UE 115 or base station 105 as described with reference to FIG. 1. TTI schemes 300 may illustrate various examples of UL and DL TTI schemes or configurations that include a one-symbol gap to enable enhanced coexistence with multiple TTIs. TTI schemes 300 may include multiple DL TTI schemes 305 and multiple UL TTI schemes 310. Each of the DL TTI schemes 305 and UL TTI schemes 310 may correspond to short TTIs embedded within TTIs of longer durations. In some cases, the structure of TTI schemes 300 may depend on a number of control symbols in a TTI.

For example, DL TTI scheme 305-a may correspond to a TTI 317 having a first duration, where the first duration may correspond to an LTE subframe. DL TTI scheme 305-a may also include control region 315-a, TTIs 320, and a symbol period 325. In some cases, control region 315-a may correspond to a duration of a single symbol period and TTIs 320 may have a second duration which may correspond a two-symbol TTI. Additionally, symbol period 325 may correspond to a one-symbol gap.

TTIs 320 in DL TTI scheme 305-a may be scheduled such that they align with the boundary of a longer TTI. For example, TTI 335 may be an example of a slot TTI, and a set of TTIs 320 and the symbol period 325 may align with the boundaries of TTI 335. Similarly, the set of TTIs 320 and the symbol period 325 may align with the boundaries of TTI 317. As a result, the different TTI durations may coexist and allow for robust scheduling in a low latency system.

A similar TTI alignment may be achieved when a control region has a longer duration. For example, DL TTI scheme 305-b includes a control region 315-b, multiple TTIs 320, and two symbol periods 325. The control region 315-b may be an example of a two-symbol control region. In some cases, when scheduling the TTIs 320, control region 315-b may be treated as a two-symbol TTI that includes a CCE. Additionally, DL TTI scheme 305-c includes control region 315-c with a duration of three symbol periods, which may effectively be a three-symbol TTI.

UL TTI schemes 310 may similarly have an embedded structure, where smaller TTIs are embedded within the same time period of larger TTIs. For instance, UL TTI scheme 310-a may include a number of TTIs 320 of the second duration and one or more symbol periods 325. As described above, TTIs 320 may correspond to a two-symbol TTI and the symbol periods 325 correspond to a one-symbol gap.

A system using the different DL TTI schemes 305 and UL TTI schemes 310, a feedback processing timeline may be increased to allow additional time for a wireless device to decode and process a received signal. Table 2 illustrates an example of a feedback timeline that may be achieved using DL TTI schemes 305 and UL TTI schemes 310 for DL and UL communications, respectively.

TABLE 2

| DL TTI index | Symbol Gap | UL TTI index | Symbol Gap | DL TTI index |
|---|---|---|---|---|
| 0 | 7 or 8 | 4 | 7 | 2 |
| 1 | 7 or 8 | 5 | 8 | 3 |
| 2 | 7 | 0 | 8 | 4 |
| 3 | 6 | 1 | 8 | 5 |
| 4 | 7 | 2 | 7 or 8 | 0 |
| 5 | 7 | 3 | 7 or 8 | 1 |

As indicated in Table 2, by using a one-symbol gap with sets of TTIs 320, processing delays between a DL TTIs and UL TTIs may be between 6 and 8 symbols. Thus, additional feedback processing time may be achieved with the simultaneous alignment of different TTI durations.

In some examples, changing the location of symbol period 325 may further enhance the feedback timeline in a low latency system. For example, UL TTI scheme 310-b may include a one-symbol gap (symbol period 325) at the start of the time period corresponding to TTI 317. As a result, the processing timeline may include symbol gaps between seven and eight symbols. Table 3 illustrates examples of a feedback processing timeline when a one-symbol gap is located at the beginning of a TTI.

TABLE 3

| DL TTI index | Symbol Gap | UL TTI index | Symbol Gap | DL TTI index |
|---|---|---|---|---|
| 0 | 7 or 8 | 4 | 7 | 2 |
| 1 | 7 or 8 | 5 | 8 | 3 |
| 2 | 8 | 0 | 7 | 4 |
| 3 | 7 | 1 | 7 | 5 |
| 4 | 7 | 2 | 7 or 8 | 0 |
| 5 | 7 | 3 | 7 or 8 | 1 |

In some cases, a symbol gap may be found at different locations in a time period corresponding to TTI 317. As an example, the location of a symbol gap may be scheduled in such a way that reduces scheduling complexity. Additionally, different combinations of TTI schemes 300 may be used to enable flexible scheduling of different wireless devices.

Figure 4:
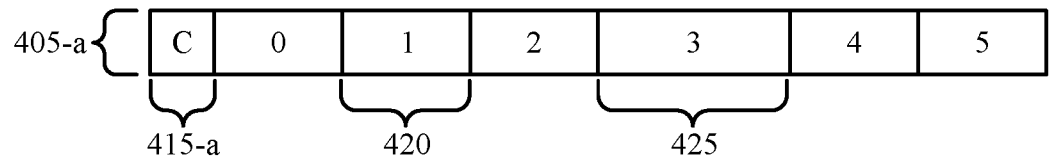
Figure 4:
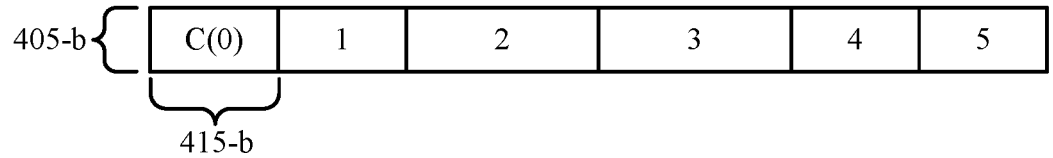
Figure 4:
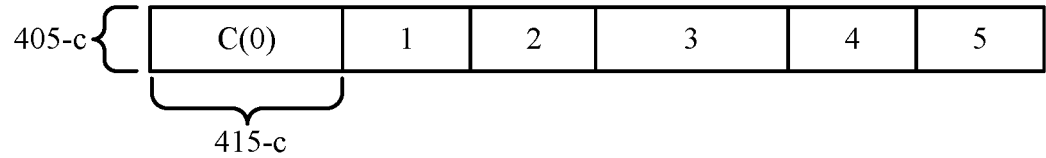
Figure 4:
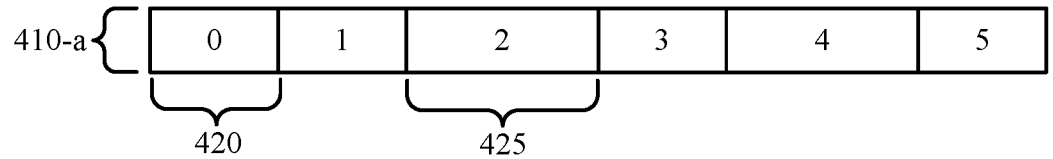
Figure 4:
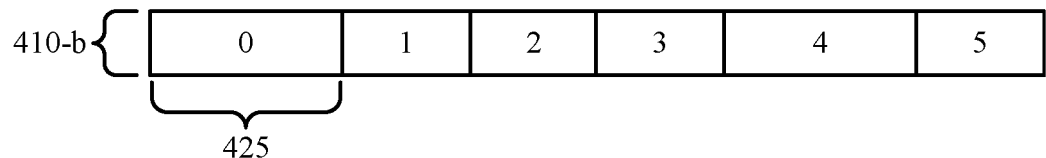

FIG. 4 illustrates an example of TTI schemes 400 in a system that supports multiple TTI coexistence in accordance with aspects of the present disclosure. In some cases, TTI schemes 400 may represent aspects of techniques performed by a UE 115 or base station 105 as described with reference to FIG. 1. TTI schemes 400 may illustrate various examples of UL and DL TTI configurations that include a merged TTI that enables enhanced coexistence with multiple TTIs. TTI schemes 400 may include multiple DL TTI schemes 405 and multiple UL TTI schemes 410. Each of the DL TTI schemes 405 and UL TTI schemes 410 may correspond to short TTIs embedded within TTIs of longer durations. In some cases, the structure of TTI schemes 400 may depend on a number of control symbols in a TTI.

For example, DL TTI scheme 405-a may correspond to a TTI 417 having a first duration, where the first duration may correspond to an LTE subframe. DL TTI scheme 405-a may also include control region 415-a, TTIs 420, and one or more symbol periods 425, which may be merged to form a three-symbol TTI. In some cases, control region 415-a may correspond to a duration of a single symbol period and TTIs 420 may have a second duration that may correspond a two-symbol TTI. Symbol period 425 may correspond to a merged TTI, where the merged TTI may include a combination of a one-symbol gap and a TTI. For instance, a merged TTI may be a three-symbol TTI from the combination of a two-symbol TTI and a one-symbol gap. Other combinations may be possible with TTIs of different durations and the one-symbol gaps.

TTIs 420 in DL TTI scheme 405-a may be scheduled such that they align with the boundary of a longer TTI. For example, TTI 435 may be an example of a slot TTI, and a set of TTIs 420 and the symbol periods 425 may align with the boundaries of TTI 435. Similarly, the set of TTIs 420 and the symbol periods 425 may align with the boundaries of TTI 417. As a result, the different TTI durations may coexist and allow for robust scheduling in a low latency system.

A similar TTI alignment may be achieved when a control region has a longer duration. For example, DL TTI scheme 405-b includes a control region 415-b, multiple TTIs 420, and two (2) symbol periods 425 (i.e., two (2) two-symbol TTIs that are merged with an additional symbol). The control region 415-b may be an example of a two-symbol control region. Additionally, DL TTI scheme 405-c includes control region 315-c with a duration of three symbol periods.

UL TTI schemes 410 may similarly have an embedded structure, where smaller TTIs are embedded within the same time period of larger TTIs. For instance, UL TTI scheme 410-a may include a number of TTIs 420 of the second duration and one or more symbol periods 425. As described above, TTIs 420 may correspond to a two-symbol TTI and the symbol periods 425 may correspond to a merged TTI.

A system using the different DL TTI schemes 405 and UL TTI schemes 410, a feedback processing timeline may be increased to allow additional time for a wireless device to decode and process a received signal. Table 4 illustrates an example of a feedback timeline that may be achieved using DL TTI schemes 405 and UL TTI schemes 410 for DL and UL communications, respectively.

TABLE 4

| DL TTI index | Symbol Gap | UL TTI index | Symbol Gap | DL TTI index |
| --- | --- | --- | --- | --- |
| 0 | 6 or 7 | 4 | 6 or 7 | 2 |
| 1 | 7 or 8 | 5 | 7 | 3 |
| 2 | 7 | 0 | 8 | 4 |
| 3 | 6 | 1 | 8 | 5 |
| 4 | 6 | 2 | 7 or 8 | 0 |
| 5 | 7 | 3 | 7 or 8 | 1 |

As indicated by Table 4, by using a merged TTI with sets of TTIs 420, processing delays between a DL TTIs and UL TTIs may be between 6 and 8 symbols. In some examples, changing the location of symbol period 425 may allow for scheduling flexibility. For example, UL TTI scheme 410-b may include a merged TTI (e.g., symbol period 425) at the start of the time period corresponding to TTI 417. As a result, the processing timeline may include symbol gaps between six and eight symbols. Table 5 illustrates examples of a feedback processing timeline when a one-symbol gap is located at the beginning of a TTI.

TABLE 5

| DL TTI index | Symbol Gap | UL TTI index | Symbol Gap | DL TTI index |
| --- | --- | --- | --- | --- |
| 0 | 6 or 7 | 4 | 6 or 7 | 2 |
| 1 | 7 or 8 | 5 | 7 | 3 |
| 2 | 7 | 0 | 7 | 4 |
| 3 | 7 | 1 | 7 | 5 |
| 4 | 7 | 2 | 7 or 8 | 0 |
| 5 | 7 | 3 | 7 or 8 | 1 |

Additionally or alternatively, various combinations of TTI schemes 400 may be used for further scheduling flexibility, where a DL TTI scheme 405 with a certain control region duration may be used with an certain UL TTI scheme 410 with a symbol period 425 in a desired location. For example, DL TTI scheme 405-b with a two-symbol control region 415-b may be used with UL TTI scheme 410-b. In this example, as illustrated in Table 6, a uniform feedback processing timeline may be achieved, with a uniform symbol gap of seven symbols for all TTIs.

TABLE 6

| DL TTI index | Symbol Gap | UL TTI index | Symbol Gap | DL TTI index |
| --- | --- | --- | --- | --- |
| 0 | 7 | 4 | 7 | 2 |
| 1 | 7 | 5 | 7 | 3 |
| 2 | 7 | 0 | 7 | 4 |
| 3 | 7 | 1 | 7 | 5 |
| 4 | 7 | 2 | 7 | 0 |
| 5 | 7 | 3 | 7 | 1 |

Figure 5:
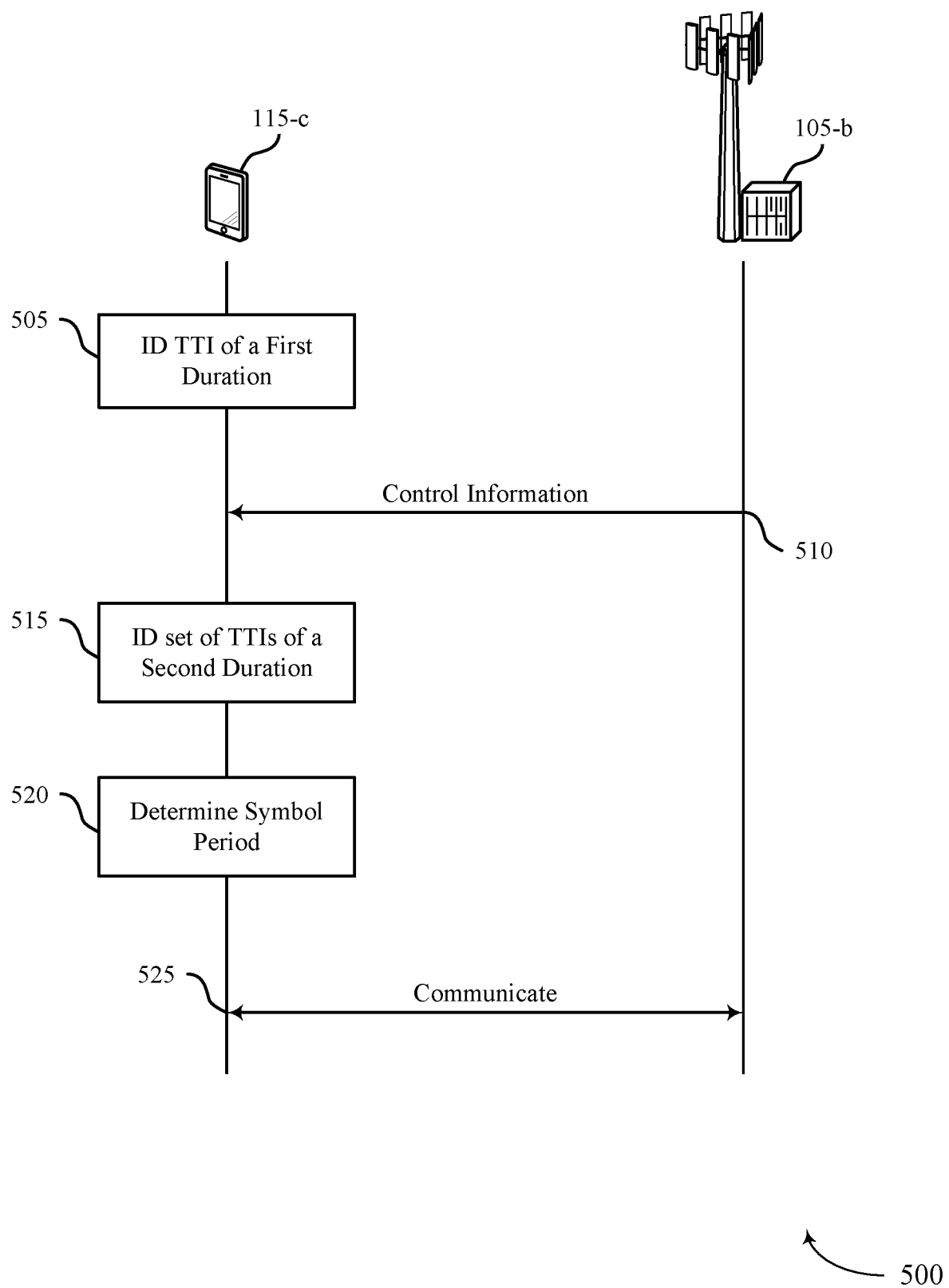
FIG. 5 illustrates an example of a process flow in a system that supports multiple TTI coexistence in accordance with aspects of the present disclosure.

FIG. 5 illustrates an example of a process flow 500 in a system that supports multiple TTI coexistence in accordance with aspects of the present disclosure. In some cases, Process flow 500 may include base station 105-b and UE 115-c, which may be examples of the corresponding devices described with reference to FIGS. 1-2. Although the below examples describe steps completed by a UE 115, these steps may represent a receiver operation and may thus be performed by a base station 105 or other device.

At 505, UE 115-c may identify a TTI of a first duration. In some examples, the first duration is a LTE subframe. UE 115-c may identify a control region of the TTI of the first duration, where the control region includes a single symbol period, two symbol periods, or three symbol periods, and at 510, may receive control information associated with the TTI of the first duration in the control region, where the control region includes three symbol periods. In some cases, the TTI of the first duration includes a first slot and a second slot.

At 515, UE 115-c may identify a set of TTIs of a second duration, wherein the set includes each TTI of the second duration that is within the TTI of the first duration. In some cases, the second duration is two LTE symbol periods. At 520, UE 115-c may determine that one or more symbol periods of the TTI of the first duration are non-overlapping with any TTI of the set of TTIs of the second duration based at least in part on identifying the set of TTIs of the second duration. In some examples, each of the one or more symbol periods includes a one-symbol gap. Additionally or alternatively, each of the one or more symbol periods includes a three-symbol TTI. In some cases, a TTI of a third duration that is less than the first duration and greater than the second duration may overlap with a subset of TTIs of the second duration within the TTI of the first duration, where the third duration may be an LTE slot.

In some examples, one of the one or more symbol periods may be located at an initial symbol period of the TTI of the first duration, and the TTI of the first duration may be an UL subframe or a DL subframe where the one or more symbol periods include a control region of the DL subframe. The one of the one or more symbol periods may also be located in an initial symbol period of the second slot, or located in the second slot. Additionally or alternatively, the one or more symbol periods may include three initial symbol periods of the second slot.

At 525, UE 115-c and base station 105-b may communicate during the TTI of the first duration based at least in part on identifying the set of TTIs of the second duration and the one or more symbol periods. In some examples, communicating during the TTI of the first duration includes receiving a control message or a data message, or both, during the at least one TTI of the second duration. Additionally or alternatively, communicating during the TTI of the first duration may include transmitting a control message or a data message, or both, during the at least one TTI of the second duration. The control message may include feedback for a data message received during a TTI of the set of TTIs of the second duration. In some cases, communicating during the TTI of the first duration includes communicating during the three-symbol TTI or during a TTI of the second duration, or both. In some cases, UE 115-c and base station 105-b may communicate using resources of the control region according to a scheme associated with the set of TTIs of the second duration.

Figure 6:
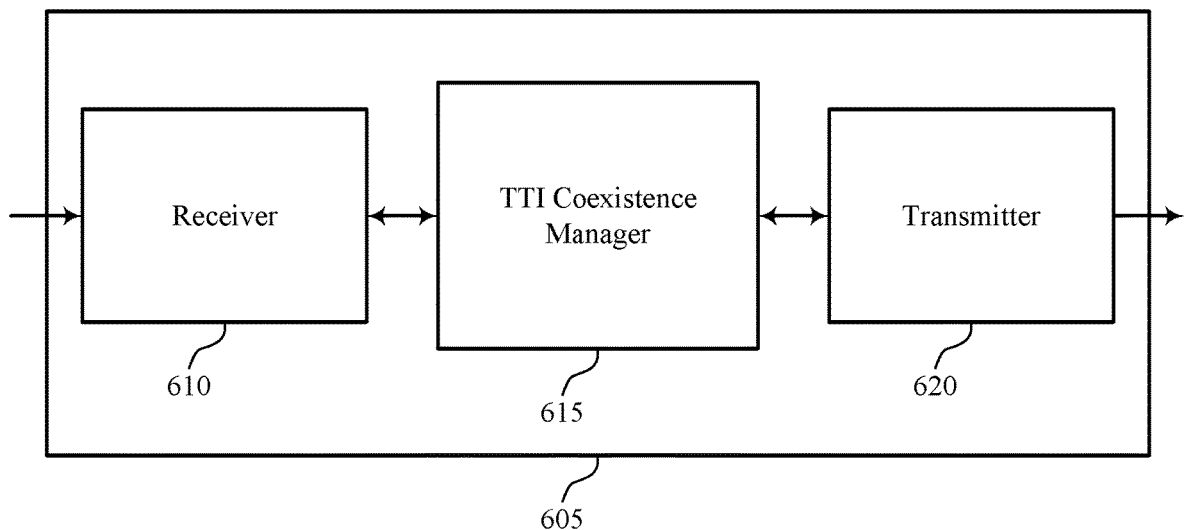
FIGS. 6 through 8 show block diagrams of a device or devices that support multiple TTI coexistence in accordance with aspects of the present disclosure.

FIG. 6 shows a block diagram 600 of a device 605 that supports multiple TTI coexistence in accordance with aspects of the present disclosure. Device 605 may be an example of aspects of a UE 115 or base station 105 as described with reference to FIGS. 1 and 2. Device 605 may include receiver 610, TTI coexistence manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to multiple TTI coexistence, etc.). Information may be passed on to other components of the device. The receiver 610 may be an example of aspects of the transceiver 940 described with reference to FIG. 9. Receiver 610 may receive a control message or a data message, or both, during the at least one TTI of the second duration.

TTI coexistence manager 615 may be an example of aspects of the TTI coexistence manager 915 as described with reference to FIG. 9. TTI coexistence manager 615 may identify a TTI of a first duration, identify a set of TTIs of a second duration, where the set includes each TTI of the second duration that is within the TTI of the first duration, determine that one or more symbol periods of the TTI of the first duration are non-overlapping with any TTI of the set of TTIs of the second duration based on identifying the set of TTIs of the second duration, and communicate during the TTI of the first duration based on identifying the set of TTIs of the second duration and the one or more symbol periods.

Transmitter 620 may transmit signals generated by other components of the device. In some examples, the transmitter 620 may be collocated with a receiver 610 in a transceiver module. For example, the transmitter 620 may be an example of aspects of the transceiver 940 as described with reference to FIG. 9. The transmitter 620 may include a single antenna, or it may include a set of antennas. Transmitter 620 may transmit a control message or a data message, or both, during the at least one TTI of the second duration.

Figure 7:
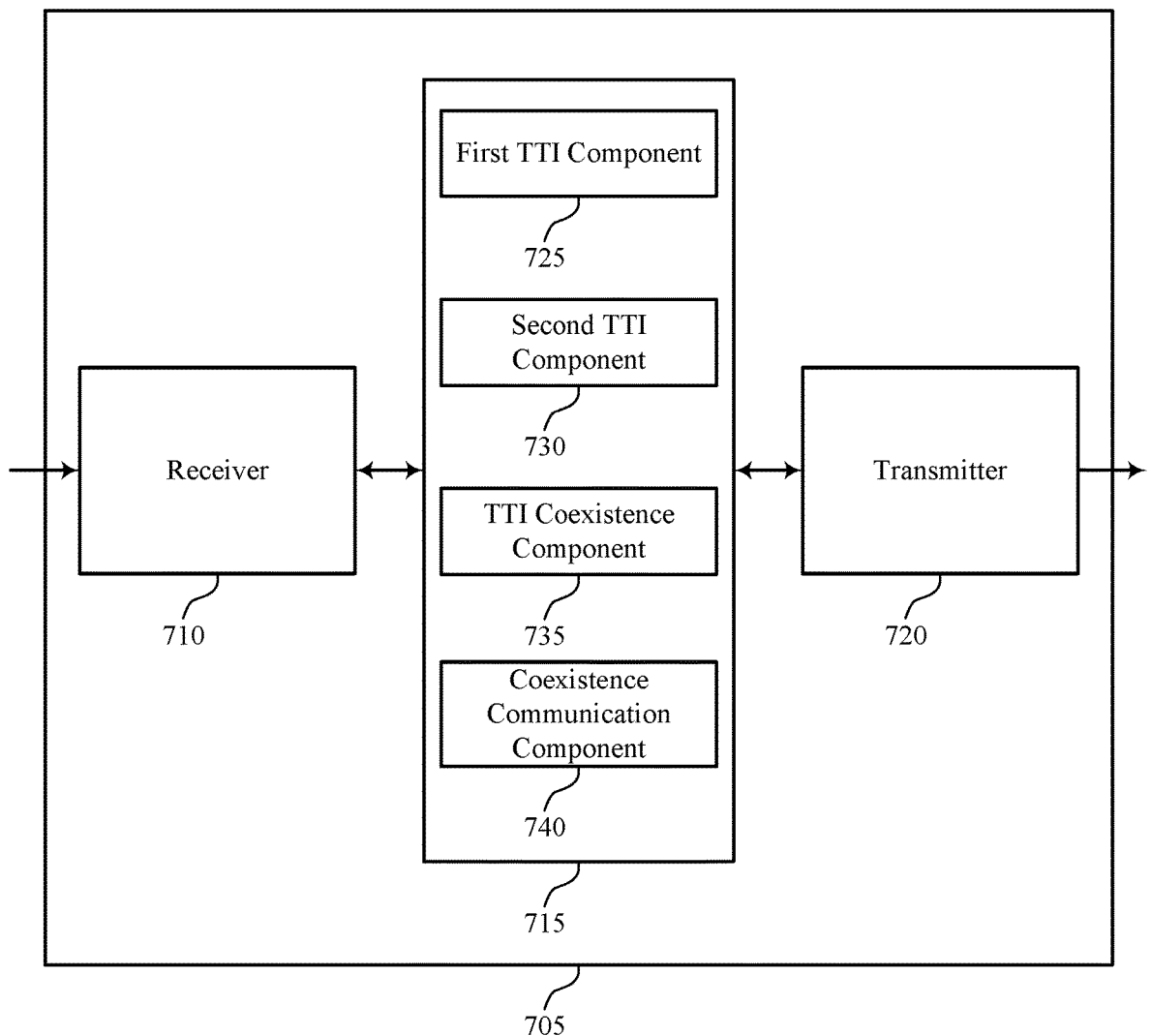

FIG. 7 shows a block diagram 700 of a device 705 that supports multiple TTI coexistence in accordance with aspects of the present disclosure. Device 705 may be an example of aspects of a device 605 or a UE 115 or base station 105 as described with reference to FIGS. 1, 2 and 6. Device 705 may include receiver 710, TTI coexistence manager 715, and transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to multiple TTI coexistence, etc.). Information may be passed on to other components of the device. The receiver 710 may be an example of aspects of the transceiver 940 as described with reference to FIG. 9.

TTI coexistence manager 715 may be an example of aspects of the TTI coexistence manager 915 as described with reference to FIG. 9. TTI coexistence manager 715 may also include first TTI component 725, second TTI component 730, TTI coexistence component 735, and coexistence communication component 740.

First TTI component 725 may identify a TTI of a first duration. In some cases, the first duration is a LTE subframe, the second duration is two LTE symbol periods, and the third duration is an LTE slot. In some cases, the TTI of the first duration is a DL subframe and the one or more symbol periods include a control region of the DL subframe. In some cases, the TTI of the first duration is an UL subframe. In some cases, the TTI of the first duration includes a first slot and a second slot, and one of the one or more symbol periods is located in an initial symbol period of the second slot.

Second TTI component 730 may identify a set of TTIs of a second duration, where the set includes each TTI of the second duration that is within the TTI of the first duration. In some cases, one of the three-symbol TTIs includes an initial three symbol periods of the UL subframe. In some cases, one of the three-symbol TTIs includes a final three symbol periods of the UL subframe.

TTI coexistence component 735 may determine that one or more symbol periods of the TTI of the first duration are non-overlapping with any TTI of the set of TTIs of the second duration based on identifying the set of TTIs of the second duration. In some cases, each of the one or more symbol periods includes a one-symbol gap. In some cases, each of the one or more symbol periods includes a portion of a three-symbol TTI. In some cases, one of the one or more symbol periods is located at an initial symbol period of the TTI of the first duration. In some cases, one of the one or more symbol periods is located in the second slot. In some cases, the TTI of the first duration includes a first slot and a second slot, and the one or more symbol periods includes three initial symbol periods of the second slot. In some cases, the first TTI is an UL subframe and the one or more symbol periods includes two three-symbol TTIs. In some cases, the TTI of the first duration corresponds to a LTE subframe and the TTI of the second duration corresponds to a two-symbol TTI.

Coexistence communication component 740, in combination with receiver 710 or transmitter 720, may communicate during the TTI of the first duration based on identifying the set of TTIs of the second duration and the one or more symbol periods. In some cases, communicating during the TTI of the first duration includes communicating during the three-symbol TTI or during a TTI of the second duration, or both.

Transmitter 720 may transmit signals generated by other components of the device. In some examples, the transmitter 720 may be collocated with a receiver 710 in a transceiver module. For example, the transmitter 720 may be an example of aspects of the transceiver 940 as described with reference to FIG. 9. The transmitter 720 may include a single antenna, or it may include a set of antennas.

Figure 8:
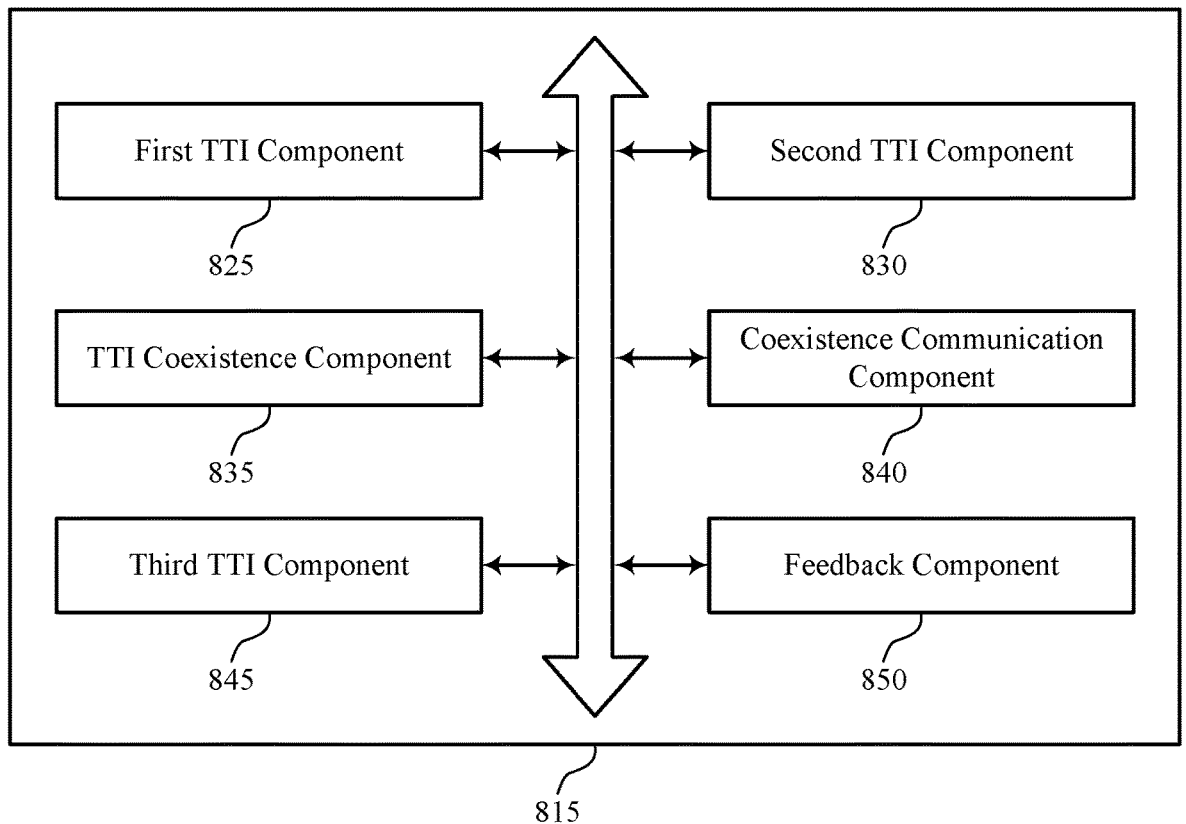

FIG. 8 shows a block diagram 800 of a TTI coexistence manager 815 that supports multiple TTI coexistence in accordance with aspects of the present disclosure. The TTI coexistence manager 815 may be an example of aspects of a TTI coexistence manager 615, a TTI coexistence manager 715, or a TTI coexistence manager 915 described with reference to FIGS. 6, 7, and 9. The TTI coexistence manager 815 may include first TTI component 825, second TTI component 830, TTI coexistence component 835, and coexistence communication component 840. Each of these modules may communicate, directly or indirectly, with one another (e.g., via one or more buses).

First TTI component 825 may identify a TTI of a first duration. Second TTI component 830 may identify a set of TTIs of a second duration, where the set includes each TTI of the second duration that is within the TTI of the first duration. TTI coexistence component 835 may determine that one or more symbol periods of the TTI of the first duration are non-overlapping with any TTI of the set of TTIs of the second duration based on identifying the set of TTIs of the second duration. Coexistence communication component 840 may, in combination with receiver 710 or transmitter 720, communicate during the TTI of the first duration based on identifying the set of TTIs of the second duration and the one or more symbol periods.

Third TTI component 845 may identify TTIs of a third duration. In some cases, a TTI of a third duration that is less than the first duration and greater than the second duration overlaps with a subset of TTIs of the second duration within the TTI of the first duration. Feedback component 850 may generate or interpret feedback for a data message. In some cases, the control message includes feedback for a data message received during a TTI of the set of TTIs of the second duration. Transmitter 720 may transmit feedback.

Figure 9:
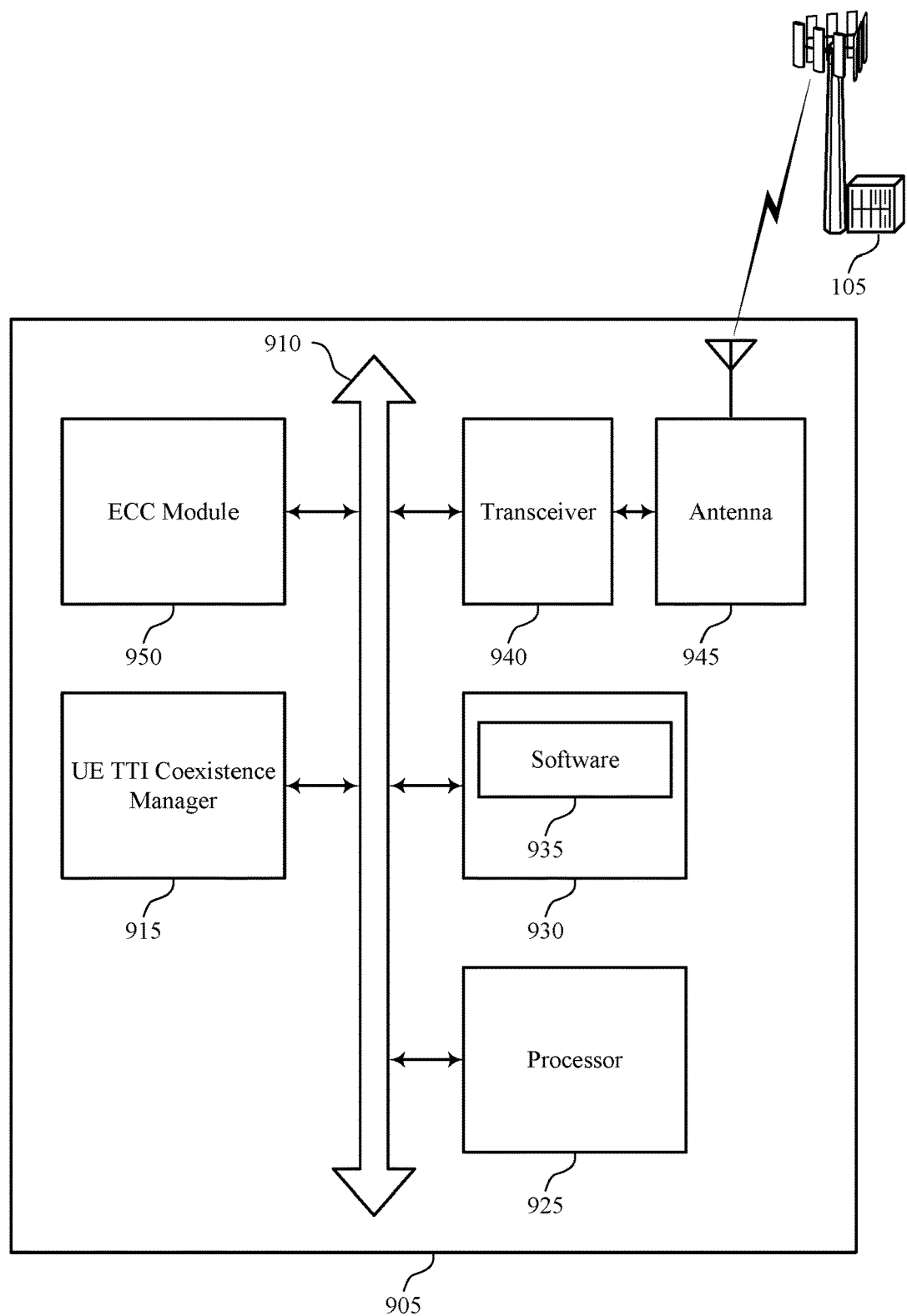
FIG. 9 illustrates a block diagram of a system including a UE that supports multiple TTI coexistence in accordance with aspects of the present disclosure.

FIG. 9 illustrates a block diagram of a system 900 including a device 905 that supports multiple TTI coexistence in accordance with aspects of the present disclosure. Device 905 may be an example of a device 605, device 705, or a UE 115 as described above, e.g., with reference to FIGS. 1, 2, 6 and 7.

Device 905 may include components for bi-directional voice and data communications including components for transmitting and receiving communications, including UE TTI coexistence manager 915, processor 925, memory 930, software 935, transceiver 940, antenna 945, and eCC module 950.

Processor 925 may include an intelligent hardware device, (e.g., a central processing unit (CPU), a microcontroller, an application specific integrated circuit (ASIC), etc.) Memory 930 may include random access memory (RAM) and read only memory (ROM). The memory 930 may store computer-readable, computer-executable software 935 including instructions that, when executed, cause the processor to perform various functions described herein. In some cases, the memory 930 can contain, among other things, a Basic Input-Output system (BIOS) which may control basic hardware and/or software operation such as the interaction with peripheral components or devices.

Software 935 may include code to implement aspects of the present disclosure, including code to support multiple TTI coexistence. Software 935 can be stored in a non-transitory computer-readable medium such as system memory or other memory. In some cases, the software 935 may not be directly executable by the processor but may cause a computer (e.g., when compiled and executed) to perform functions described herein.

Transceiver 940 may communicate bi-directionally, via one or more antennas, wired, or wireless links as described above. For example, the transceiver 940 may represent a wireless transceiver and may communicate bi-directionally with another wireless transceiver. The transceiver 940 may also include a modem to modulate the packets and provide the modulated packets to the antennas for transmission, and to demodulate packets received from the antennas. In some cases, the wireless device may include a single antenna 945. However, in some cases the device may have more than one antenna 945, which may be capable of concurrently transmitting or receiving multiple wireless transmissions. eCC module 950 may enable eCC operations such as operation with different TTIs or operation in unlicensed spectrum as described above.

Figure 10:
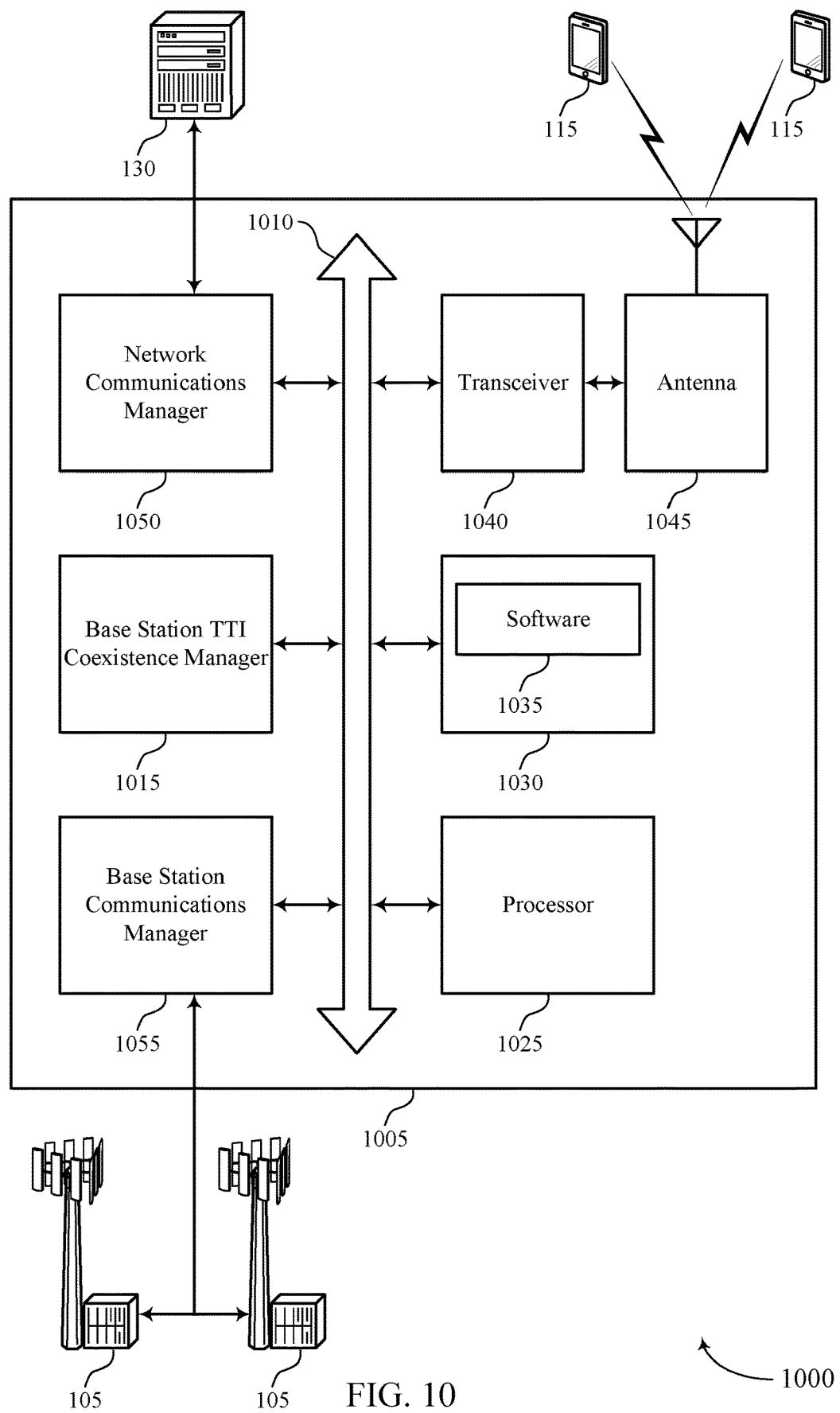
FIG. 10 illustrates a block diagram of a system including a base station that supports multiple TTI coexistence in accordance with aspects of the present disclosure.

FIG. 10 shows a block diagram of a system 1000 including a device 1005 that supports multiple TTI coexistence in accordance with aspects of the present disclosure. Device 1005 may be an example of a device 705, device 805, or a base station 105 as described above, e.g., with reference to FIGS. 1, 2, 7 and 8.

Device 1005 may include components for bi-directional voice and data communications including components for transmitting and receiving communications, including base station TTI coexistence manager 1015, processor 1025, memory 1030, software 1035, transceiver 1040, antenna 1045, network communications manager 1050, and base station communications manager 1055.

Processor 1025 may include an intelligent hardware device, (e.g., a CPU), a microcontroller, an ASIC, etc.) Memory 1030 may include RAM and ROM. The memory 1030 may store computer-readable, computer-executable software 1035 including instructions that, when executed, cause the processor to perform various functions described herein. In some cases, the memory 1030 can contain, among other things, a BIOS which may control basic hardware and/or software operation such as the interaction with peripheral components or devices.

Software 1035 may include code to implement aspects of the present disclosure, including code to support multiple TTI coexistence. Software 1035 can be stored in a non-transitory computer-readable medium such as system memory or other memory. In some cases, the software 1035 may not be directly executable by the processor but may cause a computer (e.g., when compiled and executed) to perform functions described herein.

Transceiver 1040 may communicate bi-directionally, via one or more antennas, wired, or wireless links as described above. For example, the transceiver 1040 may represent a wireless transceiver and may communicate bi-directionally with another wireless transceiver. The transceiver 1040 may also include a modem to modulate the packets and provide the modulated packets to the antennas for transmission, and to demodulate packets received from the antennas. In some cases, the wireless device may include a single antenna 1045. However, in some cases the device may have more than one antenna 1045, which may be capable of concurrently transmitting or receiving multiple wireless transmissions.

Network communications manager 1050 may manage communications with the core network (e.g., via one or more wired backhaul links). For example, the network communications manager 1050 may manage the transfer of data communications for client devices, such as one or more UEs 115.

Base station communications manager 1055 may manage communications with another base station 105, and may include a controller or scheduler for controlling communications with UEs 115 in cooperation with another base stations 105. For example, the base station communications manager 1055 may coordinate scheduling for transmissions to UEs 115 for various interference mitigation techniques such as beamforming or joint transmission. In some examples, base station communications manager 1055 may provide an X2 interface within an LTE/LTE-A wireless communication network technology to provide communication between base stations 105.

Figure 11:
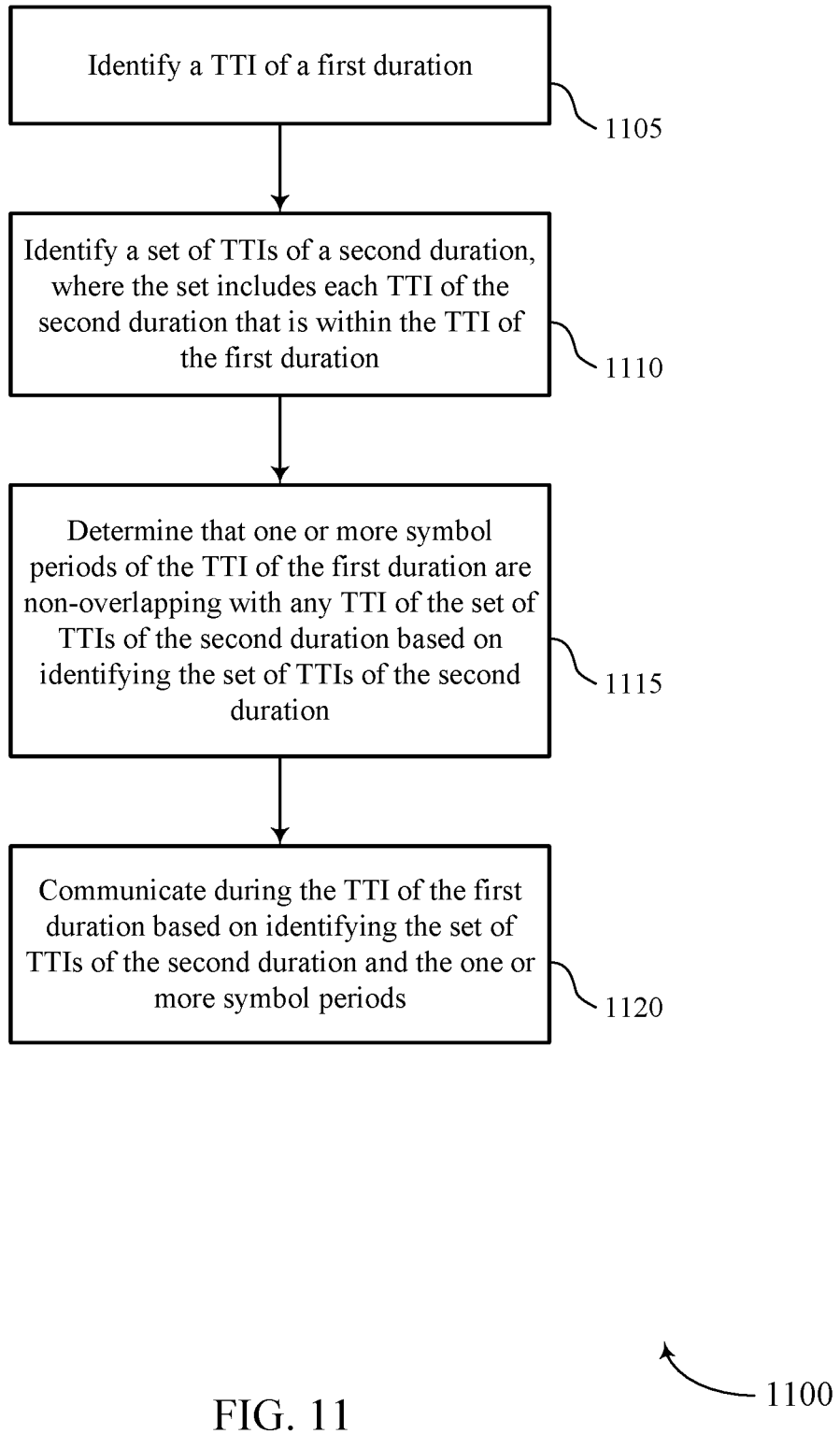
FIGS. 11 through 13 show flowcharts illustrating methods for multiple TTI coexistence in accordance with aspects of the present disclosure.

FIG. 11 shows a flowchart illustrating a method 1100 for multiple TTI coexistence in accordance with aspects of the present disclosure. The operations of method 1100 may be implemented by a UE 115 or base station 105 or its components as described herein. For example, the operations of method 1100 may be performed by a TTI coexistence manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may identify a TTI of a first duration. The operations of block 1105 may be performed according to the methods described as with reference to FIGS. 2 and 3. In certain examples, aspects of the operations of block 1105 may be performed by a first TTI component as described with reference to FIGS. 6 through 8.

At block 1110, the UE 115 or base station 105 may identify a set of TTIs of a second duration, where the set includes each TTI of the second duration that is within the TTI of the first duration. The operations of block 1110 may be performed according to the methods as described with reference to FIGS. 2 and 3. In certain examples, aspects of the operations of block 1110 may be performed by a second TTI component as described with reference to FIGS. 6 through 8.

At block 1115, the UE 115 or base station 105 may determine that one or more symbol periods of the TTI of the first duration are non-overlapping with any TTI of the set of TTIs of the second duration based on identifying the set of TTIs of the second duration. The operations of block 1115 may be performed according to the methods as described with reference to FIGS. 2 and 3. In certain examples, aspects of the operations of block 1115 may be performed by a TTI coexistence component as described with reference to FIGS. 6 through 8.

At block 1120, the UE 115 or base station 105 may communicate during the TTI of the first duration based on identifying the set of TTIs of the second duration and the one or more symbol periods. The operations of block 1120 may be performed according to the methods as described with reference to FIGS. 2 and 3. In certain examples, aspects of the operations of block 1120 may be performed by a coexistence communication component as described with reference to FIGS. 6 through 8.

Figure 12:
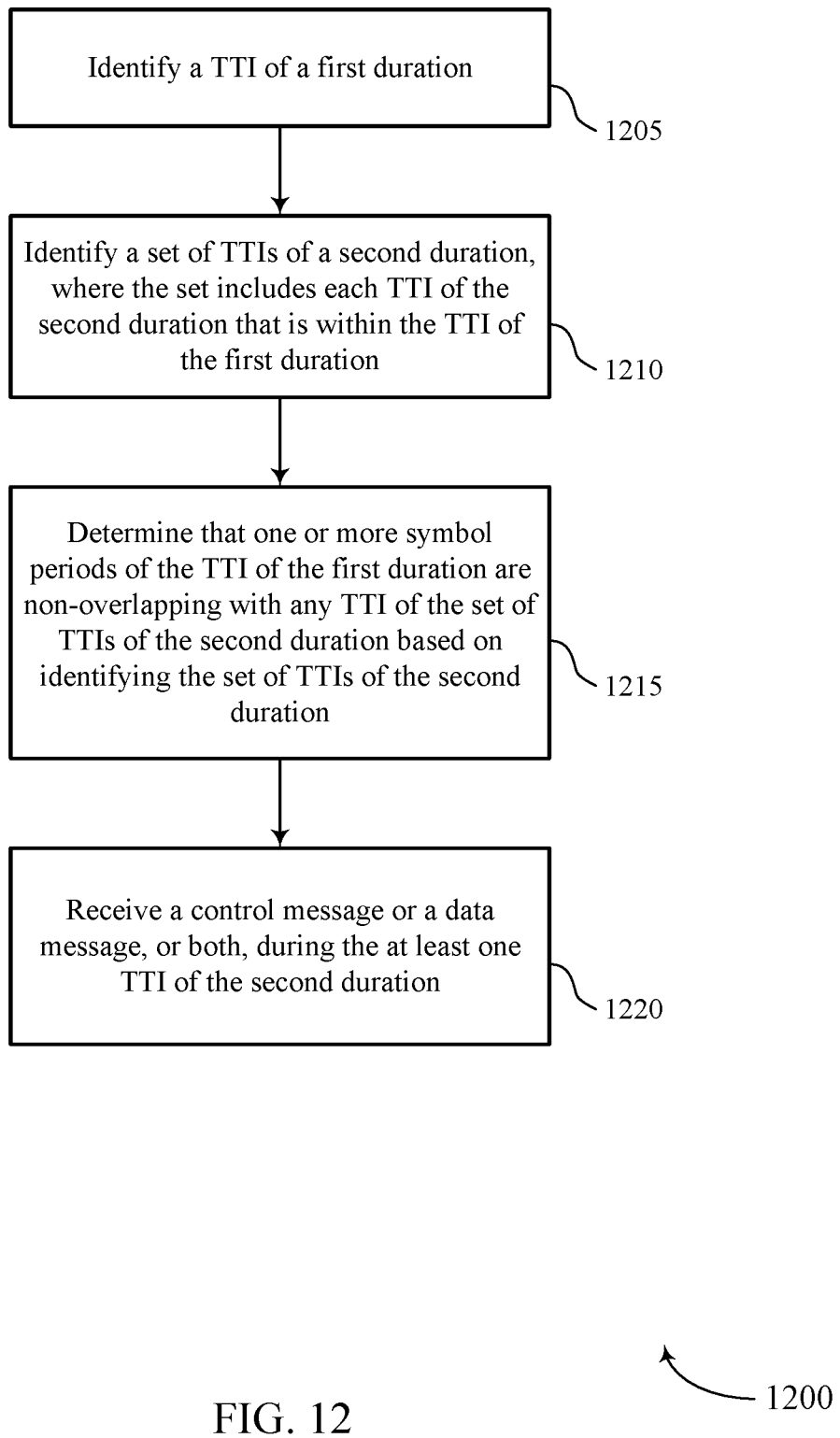

FIG. 12 shows a flowchart illustrating a method 1200 for multiple TTI coexistence in accordance with aspects of the present disclosure. The operations of method 1200 may be implemented by a UE 115 or base station 105 or its components as described herein. For example, the operations of method 1200 may be performed by a TTI coexistence manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify a TTI of a first duration. The operations of block 1205 may be performed according to the methods as described with reference to FIGS. 2 and 3. In certain examples, aspects of the operations of block 1205 may be performed by a first TTI component as described with reference to FIGS. 6 through 8.

At block 1210, the UE 115 or base station 105 may identify a set of TTIs of a second duration, where the set includes each TTI of the second duration that is within the TTI of the first duration. The operations of block 1210 may be performed according to the methods as described with reference to FIGS. 2 and 3. In certain examples, aspects of the operations of block 1210 may be performed by a second TTI component as described with reference to FIGS. 6 through 8.

At block 1215, the UE 115 or base station 105 may determine that one or more symbol periods of the TTI of the first duration are non-overlapping with any TTI of the set of TTIs of the second duration based on identifying the set of TTIs of the second duration. The operations of block 1215 may be performed according to the methods as described with reference to FIGS. 2 and 3. In certain examples, aspects of the operations of block 1215 may be performed by a TTI coexistence component as described with reference to FIGS. 6 through 8.

At block 1220, the UE 115 or base station 105 may receive a control message or a data message, or both, during the at least one TTI of the second duration. The operations of block 1220 may be performed according to the methods as described with reference to FIGS. 2 and 3. In certain examples, aspects of the operations of block 1220 may be performed by a coexistence communication component as described with reference to FIGS. 6 through 8.

Figure 13:
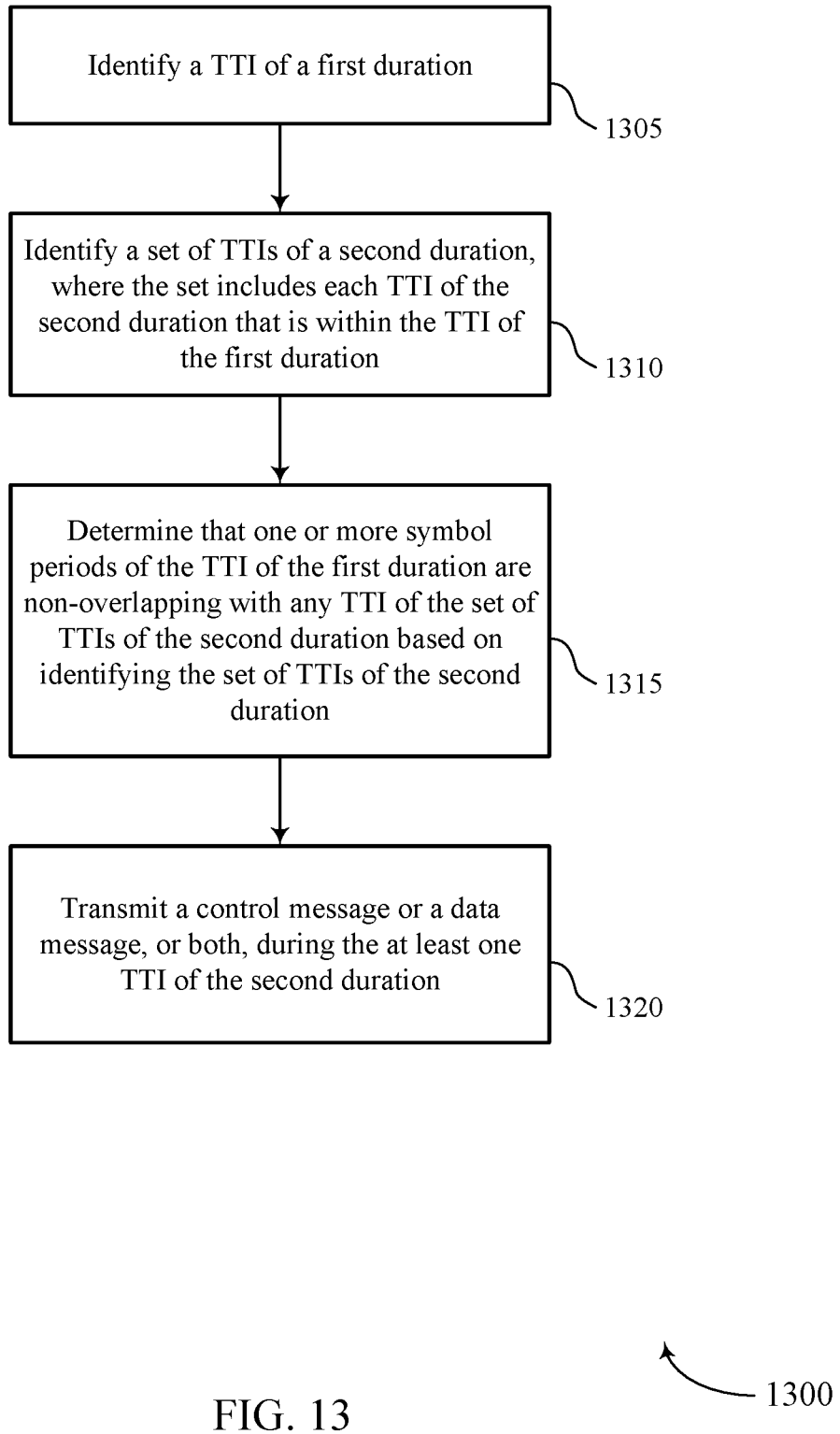

FIG. 13 shows a flowchart illustrating a method 1300 for multiple TTI coexistence in accordance with aspects of the present disclosure. The operations of method 1300 may be implemented by a UE 115 or base station 105 or its components as described herein. For example, the operations of method 1300 may be performed by a TTI coexistence manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may identify a TTI of a first duration. The operations of block 1305 may be performed according to the methods as described with reference to FIGS. 2 and 3. In certain examples, aspects of the operations of block 1305 may be performed by a first TTI component as described with reference to FIGS. 6 through 8.

At block 1310, the UE 115 or base station 105 may identify a set of TTIs of a second duration, where the set includes each TTI of the second duration that is within the TTI of the first duration. The operations of block 1310 may be performed according to the methods as described with reference to FIGS. 2 and 3. In certain examples, aspects of the operations of block 1310 may be performed by a second TTI component as described with reference to FIGS. 6 through 8.

At block 1315, the UE 115 or base station 105 may determine that one or more symbol periods of the TTI of the first duration are non-overlapping with any TTI of the set of TTIs of the second duration based on identifying the set of TTIs of the second duration. The operations of block 1315 may be performed according to the methods as described with reference to FIGS. 2 and 3. In certain examples, aspects of the operations of block 1315 may be performed by a TTI coexistence component as described with reference to FIGS. 6 through 8.

At block 1320, the UE 115 or base station 105 may transmit a control message or a data message, or both, during the at least one TTI of the second duration. The operations of block 1320 may be performed according to the methods as described with reference to FIGS. 2 and 3. In certain examples, aspects of the operations of block 1320 may be performed by a coexistence communication component as described with reference to FIGS. 6 through 8.

In some examples, aspects from two or more of the methods may be combined. It should be noted that the methods are just example implementations, and that the operations of the methods may be rearranged or otherwise modified such that the other implementations are possible.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
 identifying a duration of a control region of a transmission time interval (TTI) of a first duration;

determining a first pattern for a set of TTIs of a second duration within the TTI of the first duration based at least in part on the duration of the control region, wherein symbol periods of the control region are non-overlapping with symbol periods of the set of TTIs of the second duration; and communicating via at least one of the set of TTIs of the second duration based at least in part on the first pattern for the set of TTIs of the second duration.

2. The method of claim 1, wherein the TTI of the first duration comprises a second set of TTIs of a third duration that is less than the first duration and greater than the second duration, and wherein each of the second set of TTIs overlaps with a subset of the set of TTIs of the second duration within the TTI of the first duration.

3. The method of claim 2, wherein the first pattern is selected from a plurality of patterns for the set of TTIs of the second duration, and wherein, for each of the plurality of patterns, each of the second set of TTIs of the third duration include an integer number of the set of TTIs of the second duration.

4. The method of claim 2, wherein the first duration is a Long Term Evolution (LTE) subframe, the second duration is two or three LTE symbol periods, and the third duration is an LTE slot.

5. The method of claim 2, wherein each of the second set of TTIs comprises a non-integer number of the set of TTIs of the second duration.

6. The method of claim 1, wherein communicating via the at least one of the set of TTIs of the second duration comprises:
receiving a control message or a data message, or both, during the at least one of the set of TTIs of the second duration.

7. The method of claim 1, wherein communicating via the at least one of the set of TTIs of the second duration comprises:
transmitting a control message or a data message, or both, during the at least one of the set of TTIs of the second duration.

8. The method of claim 7, wherein the control message comprises feedback for a data message received during a TTI of the set of TTIs of the second duration.

9. The method of claim 1, wherein communicating via the at least one of the set of TTIs of the second duration comprises:
communicating during a three-symbol TTI or during a two-symbol TTI, or both.

10. The method of claim 1, wherein the TTI of the first duration is an uplink subframe and the first pattern includes two three-symbol TTIs.

11. The method of claim 10, wherein one of the three-symbol TTIs includes an initial three symbol periods of the uplink subframe.

12. The method of claim 11, wherein one of the three-symbol TTIs includes a final three symbol periods of the uplink subframe.

13. The method of claim 1, wherein the TTI of the first duration corresponds to a Long Term Evolution (LTE) subframe and the set of TTIs of the second duration comprises at least one two-symbol TTI and at least one three-symbol TTI.

14. The method of claim 1, wherein a maximum transport block size (TBS) for the set of TTIs of the second duration corresponds to the maximum TBS of a two-symbol TTI.

15. An apparatus for wireless communication, comprising:

means for identifying a duration of a control region of a transmission time interval (TTI) of a first duration;

means for determining a first pattern for a set of TTIs of a second duration within the TTI of the first duration based at least in part on the duration of the control region, wherein symbol periods of the control region are non-overlapping with symbol periods of the set of TTIs of the second duration; and means for communicating via at least one of the set of TTIs of the second duration based at least in part on the first pattern for the set of TTIs of the second duration.

16. The apparatus of claim 15, wherein the TTI of the first duration comprises a second set of TTIs of a third duration that is less than the first duration and greater than the second duration, and wherein each of the second set of TTIs overlaps with a subset of the set of TTIs of the second duration within the TTI of the first duration.

17. The apparatus of claim 16, wherein the first pattern is selected from a plurality of patterns for the set of TTIs of the second duration, and wherein, for each of the plurality of patterns, each of the second set of TTIs of the third duration include an integer number of the set of TTIs of the second duration.

18. The apparatus of claim 15, wherein the means for communicating via the at least one of the set of TTIs of the second duration comprises at least one of:
means for receiving a control message or a data message, or both, during the at least one of the set of TTIs of the second duration;
means for transmitting the control message or the data message, or both, during the at least one of the set of TTIs of the second duration; or
means for communicating during a three-symbol TTI or during a two-symbol TTI, or both.

19. The apparatus of claim 15, wherein the TTI of the first duration comprises a first slot and a second slot, and one of the symbol periods of the set of TTIs of the second duration is located in an initial symbol period of the second slot.

20. The apparatus of claim 15, wherein the TTI of the first duration is an uplink subframe and the first pattern includes two three-symbol TTIs.

21. An apparatus for wireless communication, in a system comprising:
a processor;
memory in electronic communication with the processor; and
instructions stored in the memory and operable, when executed by the processor, to cause the apparatus to:
identify a duration of a control region of a transmission time interval (TTI) of a first duration;
determine a first pattern for a set of TTIs of a second duration within the TTI of the first duration based at least in part on the duration of the control region, wherein symbol periods of the control region are non-overlapping with symbol periods of the set of TTIs of the second duration; and
communicate via at least one of the set of TTIs of the second duration based at least in part on the first pattern for the set of TTIs of the second duration.

22. The apparatus of claim 21, wherein:
the TTI of the first duration comprises a second set of TTIs of a third duration that is less than the first duration and greater than the second duration, and wherein each of the second set of TTIs overlaps with a subset of the set of TTIs of the second duration within the TTI of the first duration, and the first pattern is selected from a plurality of patterns for the set of TTIs of the second duration, and wherein, for each of the plurality of patterns, each of the second set of TTIs of the third duration include an integer number of the set of TTIs of the second duration.

23. The apparatus of claim 21, wherein the instructions are executable to the processor to cause the apparatus to:
receive a control message or a data message, or both, during the at least one of the set of TTIs of the second duration;
transmit the control message or the data message, or both, during the at least one of the set of TTIs of the second duration; or
communicate during a three-symbol TTI or during a two-symbol TTI, or both.

24. The apparatus of claim 21, wherein the TTI of the first duration comprises a first slot and a second slot, and one of the symbol periods of the set of TTIs of the second duration is located in an initial symbol period of the second slot.

25. The apparatus of claim 21, wherein the TTI of the first duration is an uplink subframe and the first pattern includes two three-symbol TTIs.

26. A non-transitory computer-readable medium storing code for wireless communication, the code comprising instructions executable to:
identify a duration of a control region of a transmission time interval (TTI) of a first duration;
determine a first pattern for a set of TTIs of a second duration within the TTI of the first duration based at least in part on the duration of the control region, wherein symbol periods of the control region are non-overlapping with symbol periods of the set of TTIs of the second duration; and
communicate via at least one of the set of TTIs of the second duration based at least in part on the first pattern for the set of TTIs of the second duration.

27. The non-transitory computer-readable medium of claim 26, wherein:
the TTI of the first duration comprises a second set of TTIs of a third duration that is less than the first duration and greater than the second duration, and wherein each of the second set of TTIs overlaps with a subset of the set of TTIs of the second duration within the TTI of the first duration, and
the first pattern is selected from a plurality of patterns for the set of TTIs of the second duration, and wherein, for each of the plurality of patterns, each of the second set of TTIs of the third duration include an integer number of the set of TTIs of the second duration.

28. The non-transitory computer-readable medium of claim 26, wherein the instructions are executable to:
receive a control message or a data message, or both, during the at least one of the set of TTIs of the second duration;
transmit the control message or the data message, or both, during the at least one of the set of TTIs of the second duration; or
communicate during a three-symbol TTI or during a two-symbol TTI, or both.

29. The non-transitory computer-readable medium of claim 26, wherein the TTI of the first duration comprises a first slot and a second slot, and one of the symbol periods of the set of TTIs of the second duration is located in an initial symbol period of the second slot.

30. The non-transitory computer-readable medium of claim 26, wherein the TTI of the first duration is an uplink subframe and the first pattern includes two three-symbol TTIs.

* * * * *